O. R. BEUSSE.
PRESS CLOTH STRIPPER.
APPLICATION FILED MAY 8, 1913.
1,076,263.
Patented Oct. 21, 1913.
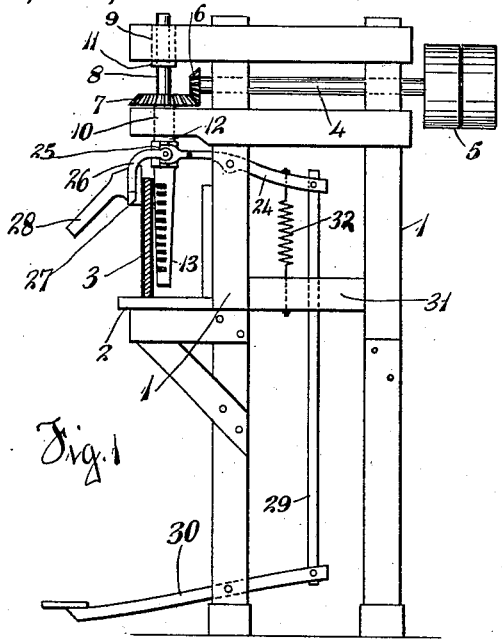
Fig. 1
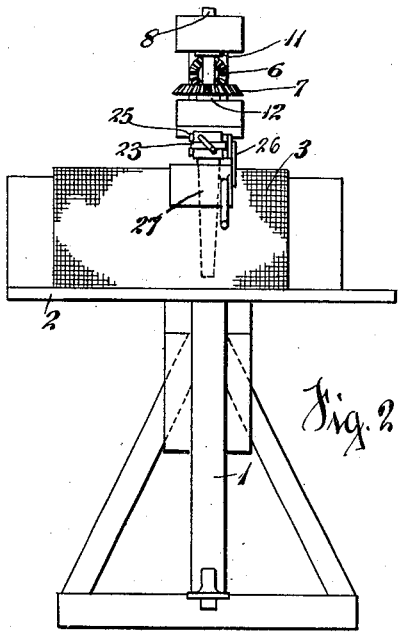
Fig. 2
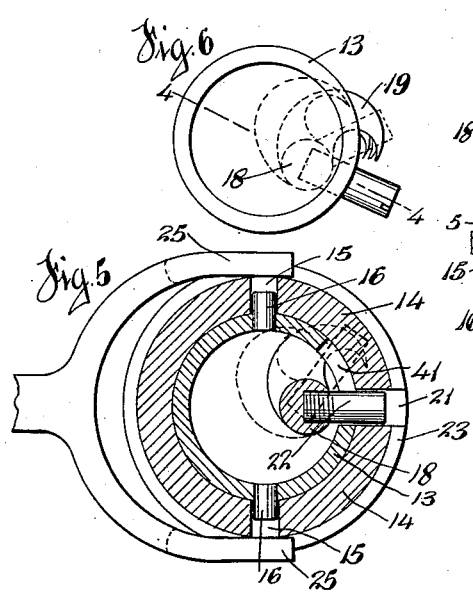
Fig. 6
Fig. 5
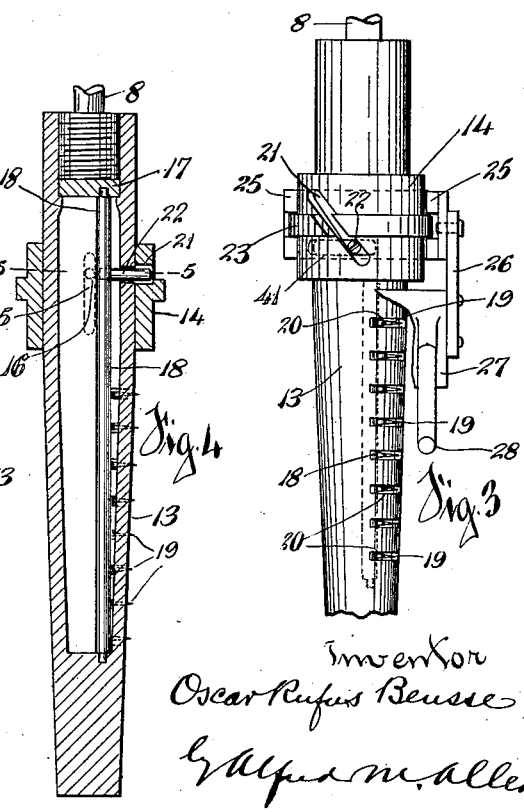
Fig. 4
Fig. 3
Inventor
Oscar Rufus Beusse
Witnesses

UNITED STATES PATENT OFFICE.

OSCAR RUFUS BEUSSE, OF ATLANTA, GEORGIA.

PRESS-CLOTH STRIPPER.

1,076,263.   Specification of Letters Patent.   Patented Oct. 21, 1913.

Application filed May 8, 1913. Serial No. 766,319.

*To all whom it may concern:*

Be it known that I, OSCAR RUFUS BEUSSE, a citizen of the United States, and a resident of Atlanta, in the county of Fulton and State of Georgia, have invented certain new and useful Improvements in Press-Cloth Strippers, of which the following is a full, clear, and exact description, reference being had to the accompanying drawings, forming part of this specification.

In the pressing of oleaginous seeds and the like, it is customary to wrap burlap or other coarse cloth or sacking about layers of the compressible material and to apply the pressure to the wrapped material. The press cloth becomes tightly adherent to the cake, and countersunk into it, and is difficult and tedious of removal. In the stripping, the cloth is unwrapped, beginning at the top fold, and a machine process should preferably be begun at such a point.

It is the object of my invention to accomplish this end and to provide an efficient stripper machine to remove the cloth quickly and completely, and this I accomplish by that certain construction and arrangement of parts to be hereinafter specifically pointed out and claimed.

In the drawings, Figure 1 is a side elevation of the machine. Fig. 2 is a front elevation of the same. Fig. 3 is a front perspective of the spindle with the hooks out. Fig. 4 is a central vertical section of the spindle on the line 4, 4, of Fig. 6, with the hooks in. Fig. 5 is a cross section taken on the line 5, 5, of Fig. 4. Fig. 6 is a rear end view of the spindle.

The standards 1, 1 are provided for supporting the parts of the machine. Located at the front of the machine is the table 2, over which the seed cake 3 is passed in the operations to be described. Suitably journaled above the table is the shaft 4, provided with tight and loose pulleys 5 for application of power, and carrying a beveled gear 6. This gear meshes with a gear 7 which is mounted on the spindle shaft 8. The spindle is revolved by this means, and its shaft is suitably journaled at 9 and 10 in the framework above the table, and provided with collars 11 and 12.

The spindle 13 above referred to is a cored, truncated conical shaft. The collar 14 is slidably mounted upon the upper end of this spindle. Vertical slots 15, 15 are cut in this collar, and pins or studs 16, 16, to slide in said slots are secured to the spindle. It can be seen that the sleeve may therefore slide longitudinally on the spindle but cannot rotate independently of it.

Journaled at one end in the spindle shaft 8 which is screwed into the end of the spindle and carries a bearing plate 17 which is seated against a shoulder inside the spindle, and journaled at the other in the base of the spindle is the hook rod or shaft 18. This rod is mounted vertically at one side of the axis of the spindle, and is provided with a series of hooks 19. In the spindle are a series of slots 20 for these hooks, of sufficient width to allow the hooks to swing in and out through them, upon the turning of the hook shaft. Furthermore the mounting of the shaft must be eccentric the spindle and such that upon one turning, the hooks will be drawn inside of the core, and upon another turning will be swung out through the slots. This turning of the shaft is adapted to be accomplished by the sliding of the sleeve on the spindle.

A cam slot 21, diagonal the axis of the sleeve, is cut through the sleeve and the spindle is provided with a horizontal slot 41. A pin 22 is suitably attached to the hook rod or shaft and extends outwardly through this slot. Since the sleeve cannot revolve except with the spindle and the shaft and is capable of longitudinal motion only, this movement will swing the pin 22 horizontally and rock the hook shaft 18. The pin is so located that when it is at the bottom of this slot, and at that end of its swing, the hooks will be in (Fig. 3), and when the pin is at the top of the slot and at the other end of its swing, the hooks will be projected out of the spindle.

Since the hook shaft is mounted parallel to the axis of the spindle, the points of the hooks will present a straight tearing line to the press cloth on a cake of meal, and since they are swung in and out in an arc, they can be withdrawn from such fabric as they have removed without tearing or sticking.

The sleeve is moved up and down by force applied to the peripheral flange 23 thereon. A lever arm 24 pivoted on the forward standard 1 has for contact with the flange a bifurcated end portion with contact plates 25, 25, grooved to slidably receive the flange. Pivotally mounted on one of these plates is the arm 26 which carries the downwardly depending cake holding plate 27. For the purpose of pressing this plate against the cake and thereby bringing the cake into contact with the spindle and hooks, there is attached to the plate the handle 28. By this means the cake may be pressed against the spindle so as to travel with it before the hooks are thrown out.

At the other end of the lever is pivotally connected the arm 29 which is attached to the foot treadle arm 30. A coiled spring 32 is also attached to this end of the arm, and held by the cross piece 31 of the frame. This spring tends to pull down its end of the lever, while the raising of the treadle arm raises that end of the lever. Thus when the treadle is operated, the contact plates press down on the flange 23 of the spindle sleeve, and thereby as already detailed, swing out the hooks 20. Upon release of the treadle, the spring pulls the sleeve upwardly and draws in the hooks. The cake holding plate must be pushed in independently as is obvious from the construction set out above.

In the use of the machine, the cakes wrapped with the burlap are presented one at a time to the rapidly rotating spindle and in such a way that the top layer of cloth may be taken hold of first. The cakes are held against the spindle either by hand, when the plate 27 and handle 28 may be omitted, or they may be held by using the plate 27. As soon as a cake is properly presented, the hooks are thrown out and they embed themselves in the cloth and wrap it around the spindle, the cake itself following the movement of the cloth and being turned around as the cloth is unwrapped. The moment the cloth is wrapped around the spindle the hooks are withdrawn and the cloth slides off of the cone shaped spindle.

In the construction detailed, I have set out the approved arrangements only, and do not wish to be limited to the exact form described. The spindle might well be purely cylindrical in shape, for example, and the lever arrangement altered into some equivalent structure. The intention is in no way to disclaim in this specification the novel features as set out in the claims.

Having thus described my invention, what I claim as new and desire to secure by Letters Patent, is:

1. In a press cloth stripper, a spindle, means for revolving said spindle, a shaft mounted in said spindle and rotating therewith, hooks on said shaft, and means for turning said shaft to reciprocate said hooks in and out of said spindle.

2. In a press cloth stripper, a spindle, means for revolving said spindle, a shaft mounted in said spindle and rotating therewith, hooks on said shaft, and means on said spindle and revolving therewith for turning said shaft to reciprocate said hooks in and out of said spindle.

3. In a press cloth stripping machine, a conical spindle, means for revolving said spindle, a series of hooks mounted in said spindle, and means for reciprocating said hooks in and out of the spindle.

4. In a press cloth stripping machine, a conical spindle, means for revolving said spindle, a shaft in said spindle, a series of hooks on said shaft, and means for turning said shaft to reciprocate said hooks in and out of the spindle.

5. In a press cloth stripping machine, a conical spindle, means for revolving said spindle, a shaft in said spindle, a series of hooks on said shaft, and means mounted on the spindle and revolving therewith, for turning said shaft to reciprocate said hooks in and out of the spindle.

6. In a press cloth stripping machine, a conical spindle, means for revolving said spindle, a perpendicular shaft in said spindle, a series of hooks on said shaft, a collar mounted to slide longitudinally on said spindle, a cam slot on said collar, and connection between the cam slot and the shaft, for the purpose described.

7. In combination with supporting members and a table, a conical spindle, means for revolving said spindle, a plate for holding the pressed product against the spindle, a shaft in said spindle, a series of hooks on said shaft, and means on said spindle for turning the shaft, to reciprocate said hooks in and out of the spindle.

8. In a press cloth stripping machine, a spindle, means for revolving said spindle, a series of hooks mounted in said spindle, and means for reciprocating said hooks in and out of said spindle.

9. In a press cloth stripping machine, a spindle, means for revolving said spindle, a series of hooks mounted in said spindle, means for reciprocating said hooks in and out of said spindle, and independent means for bringing the cloth to be stripped into contact with the hooks.

OSCAR RUFUS BEUSSE.

Attest:
C. LOUTHIT,
J. L. FARLEY.

---

Copies of this patent may be obtained for five cents each, by addressing the "Commissioner of Patents, Washington, D. C."